(12) United States Patent
Luers et al.

(10) Patent No.: US 9,661,138 B2
(45) Date of Patent: May 23, 2017

(54) SYSTEM AND METHOD FOR AUTOMATIC INTENTION EVALUATION AND COMMUNICATION ROUTING

(71) Applicant: Unify GmbH & Co. KG, Munich (DE)

(72) Inventors: Jurgen Luers, Borchen (DE); Ingolf Thiele, Erwitte (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 14/596,636

(22) Filed: Jan. 14, 2015

(65) Prior Publication Data

US 2016/0205254 A1 Jul. 14, 2016

(51) Int. Cl.
*H04M 3/00* (2006.01)
*H04M 3/523* (2006.01)
*H04M 3/46* (2006.01)
*H04M 3/54* (2006.01)

(52) U.S. Cl.
CPC .......... *H04M 3/5232* (2013.01); *H04M 3/46* (2013.01); *H04M 3/54* (2013.01); *H04M 2201/14* (2013.01); *H04M 2201/16* (2013.01); *H04M 2203/2038* (2013.01); *H04M 2203/551* (2013.01)

(58) Field of Classification Search
CPC ...................................................... H04M 3/58
USPC ...... 379/265.01–265.14, 266.01–266.1, 309, 379/202.01, 158
See application file for complete search history.

(56) References Cited

U.S. PATENT DOCUMENTS

| | | | |
|---|---|---|---|
| 6,128,380 | A | 10/2000 | Shaffer et al. |
| 6,215,865 | B1 | 4/2001 | McCalmont |
| 6,259,785 | B1 | 7/2001 | Shaffer et al. |
| 6,327,364 | B1 | 12/2001 | Shaffer et al. |
| 6,363,145 | B1 | 3/2002 | Shaffer et al. |
| 6,687,877 | B1 | 2/2004 | Sastry et al. |
| 6,819,755 | B2 | 11/2004 | Stumer et al. |

(Continued)

FOREIGN PATENT DOCUMENTS

| | | |
|---|---|---|
| CN | 102394988 A | 3/2012 |
| EP | 1396990 A1 | 10/2004 |

(Continued)

*Primary Examiner* — William Deane, Jr.
(74) *Attorney, Agent, or Firm* — Buchanan Ingersoll & Rooney PC (57) ABSTRACT

A communication system and method for routing communications can include a communication device that is configured to route a communication connection based on empirical data relating to an attempted communication. For instance, in some embodiments the device of a communication system can be configured to utilize stored and classified empirical data for automatically determining a subject of an attempted communication made by a user via the user's communication terminal and dependencies the user for that attempted communication may have on a callee for use in establishing a connection for the caller based on the determined dependencies and determined subject of the attempted communication. Information regarding the determined subject of the communication attempt can be based on the stored empirical data. The attempted communication can also be rerouted to another user based on the empirical communication data if that attempted communication is not established within a pre-selected time period.

20 Claims, 5 Drawing Sheets

(56) References Cited

U.S. PATENT DOCUMENTS

| | | | |
|---|---|---|---|
| 6,934,379 B2 | 8/2005 | Falcon et al. | |
| 7,336,779 B2* | 2/2008 | Boyer | H04M 3/51 379/265.02 |
| 7,697,677 B2 | 4/2010 | Hack | |
| 8,391,463 B1* | 3/2013 | Kiefhaber | G06Q 30/0201 379/265.01 |
| 8,515,049 B2* | 8/2013 | Chavez | G06F 17/30864 379/265.02 |
| 8,516,052 B2* | 8/2013 | Fu | H04L 12/1818 709/205 |
| 8,767,933 B2 | 7/2014 | Tietsch et al. | |
| 9,197,448 B2* | 11/2015 | Bhatti | H04L 12/6418 |
| 2003/0185379 A1* | 10/2003 | O'Connor | H04L 12/5855 379/265.02 |
| 2009/0190750 A1 | 7/2009 | Xie et al. | |
| 2010/0027778 A1 | 2/2010 | Kumar et al. | |
| 2010/0191799 A1* | 7/2010 | Fiedorowicz | G06F 17/30873 709/203 |
| 2011/0106895 A1* | 5/2011 | Ventilla | G06Q 10/10 709/206 |
| 2011/0150198 A1* | 6/2011 | Walsh | H04M 3/56 379/202.01 |
| 2013/0051545 A1* | 2/2013 | Ross | H04M 3/523 379/265.02 |
| 2015/0081802 A1* | 3/2015 | Borenstein | H04L 51/04 709/206 |
| 2015/0088988 A1* | 3/2015 | Yuan | H04L 67/02 709/204 |

FOREIGN PATENT DOCUMENTS

| | | |
|---|---|---|
| EP | 1560410 A2 | 8/2005 |
| GB | 2367167 A | 3/2002 |
| WO | 2007017361 A1 | 2/2007 |
| WO | 2014042640 A1 | 3/2014 |
| WO | 2014094997 A1 | 6/2014 |

* cited by examiner

| User | Communication Type | Topic | Time | Participants |
|---|---|---|---|---|
| First | Telephone | Unknown | Within 3 hours | Fourth and Fifth Users |
| First | Email | Product X and Marketing | Within 3 days | Third user |
| First | Social Networking Message | Marketing | Within 5 days | Second and Fourth Users |
| First | Email | Product Y | Within 8 days | Fourth User |
| Second | Text message | Project Plan Z | Within 3 hours | Fourth and Fifth Users |
| Second | Social Networking Message | Product X | Within 3 days | Third User |
| Second | Email | Marketing | Within 7 days | Fourth User |
| Second | Telephone | Product Y | Within 9 days | Fourth User |
| Third | Email | Marketing | Within 2 days | Fourth User |
| Third | Telephone | Product X | Within 4 days | Third User |
| Third | Telephone | Unknown | Within 4 days | Second User |
| Third | Email | Product Y | Within 5 days | Fourth User and First User |
| Fourth | Email | Product Y | Within 3 hours | First User |
| Fourth | Instant Message | Product X | Within 4 days | Third User |
| Fourth | Text Message | Project Plan Z | Within 4 days | Fifth User |
| Fifth | Telephone | Unknown | Within 2 days | Second User |
| Fifth | Email | Product X | Within 4 days | Fifth User |

SYSTEM AND METHOD FOR AUTOMATIC INTENTION EVALUATION AND COMMUNICATION ROUTING

FIELD OF INVENTION

The present invention relates to communication systems, a communication device, and methods of using the same.

BACKGROUND OF THE INVENTION

In many situations, an attempted communication can involve an attempt at reaching a person via a call center or other type of communication system. Examples of communication systems can be understood from U.S. Pat. Nos. 8,767,933, 7,697,677, 6,819,755, 6,687,877, 6,363,145, 6,327,364, 6,259,785, and 6,128,380 and International Publication Nos. WO 2014/094997 and WO 2014/042640.

Communication attempts can often involve a caller attempting to call a callee to establish a communication session (e.g. a phone call or video call) or a message sender sending a message, such as a text message or an email, to at least one addressee. Some calls may not be accepted or answered. Some text messages or emails may be ignored or otherwise lost due to how busy the addressee may be and the volume of communications that person may have to manage. Even when calls or messages are answered, the callee or recipient may not be able to address the subject of that call or message and have to forward the message or call to another, more knowledgeable person. For instance, a caller to a service hot line may have to have their call forwarded one or more times to have a particular technical issue adequately addressed by a person with the expertise necessary to address the subject of the caller's communication.

Calls to hotlines or call centers can often involve long periods of time in which an attempted call is placed on hold or is in a waiting queue until a service representative is able to receive that call. Such long wait times can result in an attempted caller giving up on the attempted communication due to the long wait time, which can negatively affect the caller's view of service being provided to the caller.

SUMMARY OF THE INVENTION

A method for routing a communication request for a communication session is provided. Embodiments of the method can include the steps of: receiving a first request for a communication session from a first communication terminal of a first user that is addressed to a second communication terminal of a second user or an address associated with the second user, evaluating past communication data for communications involving the first user and the second user to identify topics that are common to communications involving the first user and communications involving the second user to identify probable topics of the first request, evaluating past communication data for communications involving other users to determine topics that those users are able to address for the first user, determining that a third user of the other users is best for addressing at least one identified topic of the first request based on the evaluating of the past communication data for communications involving the other users and an evaluation of past communication data involving the first user, and upon a determination that the first request was not accepted for establishing the communication session within a pre-selected time period, routing the first request to a third communication terminal of the third user or an address associated with the third user.

In some embodiments, the method may be performed by a communication routing system or at least one device of the communication routing system. For example, in some embodiments, the method may be performed by a routing device or other type of computer device that is configured for communication routing determinations. In other embodiments, the method may be performed by different devices. For instance, in some embodiments, a computer device that is configured for communication routing determinations, a device for predicting future topics may each perform different steps of the method.

In some embodiments, the method can also include the steps of determining that a fourth user of the other users is second best for addressing the identified most probable topic of the first request based on the evaluating of the past communication data for communications involving the other users and an evaluation of past communication data involving the first user, and upon a determination that the first request was not accepted for establishing the communication session with the third user after the first request was routed to the third communication terminal of the third user or the address associated with the third user within a pre-selected time period, routing the first request to a fourth communication terminal of the fourth user or an address associated with the fourth user.

The method can also include collecting communication data for communications involving the users to identify topics of communications exchanged between different users and saving topic information identified from the collection communication data in non-transitory memory. In some embodiments, a routing device or other element of a communication routing system may collect the data and have that data saved in memory of a data storage device or memory of a component of the communication routing system. In other embodiments, user communication terminals may collect such data and subsequently have the data saved in memory of a data storage device or an element of a communication routing system.

In some embodiments of the method, the evaluating past communication data for communications involving other users to determine topics that those users are most likely able to address for the first user can comprise evaluating topics from past communications involving the first user and the second user to identify a probability that the identified topics common to the first and second user will be the subject of the communication session sought to be established via the first request. Also, the determining that the third user of the other users is best for addressing the identified most probable topic of the first request based on the evaluating of the past communication data for communications involving the other users and an evaluation of past communication data involving the first user can include using the identified topics that are common to the first and second user to identify the third user. The using of the identified topics that are common to the first and second user to identify the third user can include, for at least some embodiments, the steps of: evaluating topics from past communications involving the other users to identify at least one topic from those past communications that are common to the determined topics of the communications involving the first user and comparing the communications of the other users having topics that are common to the determined topics of the communications involving the first user to determine a user that has a highest relevance to at least one of the determined topics of the communications involving the first user. In some embodiments, the highest relevance of a user is determined to be a user having a largest weight of probability that that user is experienced with at least one identified topic of the communication session that is intended to be established via the first request.

Embodiments of the method can also include filtering of data. For example, embodiments of the method can also include the step of filtering the evaluating of topics from past communications involving the other users to identify at least one topic from those past communications that are common to the determined topics of the communications involving the first user based on presence information of the other users. As another example, some embodiments of the method can include the step of defining data of the past communications involving the other users based on presence data for those users so that non-available users are filtered out of the data prior to performing of the evaluating of topics from the past communications involving the other users so that a non-available user is not identifiable as the third user.

The first request can be a communication request that seeks to establish a communication session. In some embodiments, the first request can be an attempted call initiated by the first communication terminal to establish a phone call with the second communication terminal. In other embodiments, the first request may be a communication request seeking to establish a conference call with multiple users, a communication request seeking to establish an instant messaging conversation, or a communication request seeking to establish some other type of communication session.

In some embodiments of the method, a routing device can receive the first request prior to attempting to establish a phone call connection between the first communication terminal and the second communication terminal. In some of these embodiments, the routing device may be a conference server computer device or a switch device.

A communication routing system is also provided. Embodiments of the communication routing system can include at least one device having hardware that comprises at least one processor connected to non-transitory memory and at least one transceiver unit. The memory can have at least one application stored therein that defines a method that is performed by the communication routing system when the application is executed by the processor. The method defined by the application can include the steps of: evaluating past communication data for communications involving a first user associated with a first communication terminal and a second user associated with a second communication terminal to identify topics that are common to communications involving the first user and communications involving the second user to identify at least one probable topic of the first request, evaluating past communication data for communications involving other users associated with other communication terminals to determine topics that those users are most likely able to address for the first user, determining that a third user of the other users is best for addressing at least one identified probable topic of the first request based on the evaluating of the past communication data for communications involving the other users and an evaluation of past communication data involving the first user, and upon a determination that the first request was not accepted for establishing the communication session within a pre-selected time period, causing the first request to be routed to a third communication terminal of the third user or an address associated with the third user.

In some embodiments, a communication system can be provided that includes the communication routing system and also includes communication terminals and network elements that are communicatively connectable to at least one device of the communication routing system. For example, network nodes, communication terminals, at least one gateway, and other network elements can be included in some embodiments of the communication system.

In some embodiments, the at least one device of the communication routing system can include a routing device communicatively connected to a computer device having the application stored in memory of the computer device. That computer device can be configured for communication routing determinations via the application stored in its memory. In other embodiments, the at least one device can also include a third device that is configured for predicting future topics that is communicatively connected to the computer device configured for communication routing determinations. An application may be stored in the memory of the device that is configured for predicting future topics that defines a method by which that device predicts further topics of a communication request and communicates those predicted topics to the computer device for use in determining which third user may be best suited for receiving a communication request in the event a second user addressee or callee of that communication request fails to cause his or her communication terminal to answer that communication request for establishing the requested communication session within a pre-selected time period.

In some embodiments of the communication routing system, the application stored in the memory can be configured to define the method to also include the steps of: determining that a fourth user of the other users is second best for addressing the identified at least one probable topic of the first request based on the evaluating of the past communication data for communications involving the other users and an evaluation of past communication data involving the first user and, upon a determination that the first request was not accepted for establishing the communication session with the third user after the first request was routed to the third communication terminal of the third user or the address associated with the third user within a pre-selected time period, causing the first request to be routed to a fourth communication terminal of the fourth user or an address associated with the fourth user.

In some embodiments of the communication routing system, the application stored in the memory can be configured to define the method to also include the steps of: collecting communication data for communications involving the users to identify topics of communications exchanged between different users and saving topic information identified from the collection communication data in non-transitory memory of a data storage device, of the computer device having the application stored in its memory, or in non-transitory memory of another device that is communicatively connected to the device having the application stored in its memory.

In some embodiments, the communication routing system can be configured such that the evaluating of past communication data for communications involving other users to determine topics that those users are most likely able to address for the first user comprises defined by the application includes the step of evaluating topics from past communications involving the first user and the second user to identify a probability that the identified topics common to the first and second user will be the subject of the communication session sought to be established via the first request.

In some embodiments, the communication routing system can be configured such that the determining that the third user of the other users is best for addressing the identified most probable topic of the first request based on the evaluating of the past communication data for communications involving the other users and an evaluation of past communication data involving the first user can include using the identified topics that are common to the first and second user to identify the third user. The using of the identified topics that are common to the first and second user to identify the third user can include evaluating topics from past communications involving the other users to identify at least one topic from those past communications that are common to the determined topics of the communications involving the first user and comparing the communications of the other users having topics that are common to the determined topics of the communications involving the first user to determine a user that has a highest relevance to at least one of the determined topics of the communications involving the first user.

In some embodiments, the application stored in the memory of the device of the communication routing system can also define a filtering of data step of the method. For instance, the method defined by the application can include the step of filtering the evaluating of topics from past communications involving the other users to identify at least one topic from those past communications that are common to the determined topics of the communications involving the first user based on presence information of the other users received from a presence detecting device. As another example, the method defined by the application can include the step of defining data of the past communications involving the other users based on presence data for those users so that non-available users are filtered out of the data prior to performing of the evaluating of topics from the past communications involving the other users so that a non-available user is not identifiable as the third user.

A communication system is also provided that includes a communication routing system having a computer device configured to make communication routing determinations. The computer device can be configured to evaluate past communication data for communications involving a first user associated with a first communication terminal and a second user associated with a second communication terminal to identify topics that are common to communications involving the first user and communications involving the second user to identify at least one probable topic of a first communication request. The computer device can also be configured to evaluate past communication data for communications involving other users associated with other communication terminals to determine topics that those users are most likely able to address for the first user. The computer device can also be configured to determine that a third user of the other users is best for addressing at least one identified probable topic of the first request based on the evaluating of the past communication data for communications involving the other users and an evaluation of past communication data involving the first user. The computer device can additional be configured such that, upon a determination that the first request was not accepted for establishing the communication session within a pre-selected time period, the first request is caused to be routed to a third communication terminal of the third user or an address associated with the third user.

Other details, objects, and advantages of the invention will become apparent as the following description of certain present preferred embodiments thereof and certain present preferred methods of practicing the same proceeds.

BRIEF DESCRIPTION OF THE DRAWINGS

Exemplary devices, systems, and methods for routing of communications between multiple communication devices are shown in the accompanying drawings and certain exemplary methods of practicing the same are also illustrated therein. It should be understood that like reference numbers used in the drawings may identify like components.

DETAILED DESCRIPTION OF EXEMPLARY EMBODIMENTS

Referring to FIGS. 1-6, a communication system 1 can include multiple communication terminals that are each communicatively connectable to each other via a communication routing system 3. For instance, the communication terminals can include a first communication terminal 5, a second communication terminal 7, a third communication terminal 9, a fourth communication terminal 11, and a fifth communication terminal 13. Each communication terminal can be associated with a particular user. For instance, a first user can be associated with the first communication terminal 5, a second user can be associated with the second communication terminal 7, a third user can be associated with the third communication terminal 9, a fourth user can be associated with the fourth communication terminal 11, and a fifth user 13 can be associated with the fifth communication terminal 13. Embodiments of the system can be configured so that more than five communication terminals or less than five communication terminals are utilized and communicatively connectable to each other via a communication routing system 3 (e.g. an embodiment of the system may utilize only four terminals, ten terminals, one hundred terminals, or more than one hundred terminals, etc.).

Figure 1:
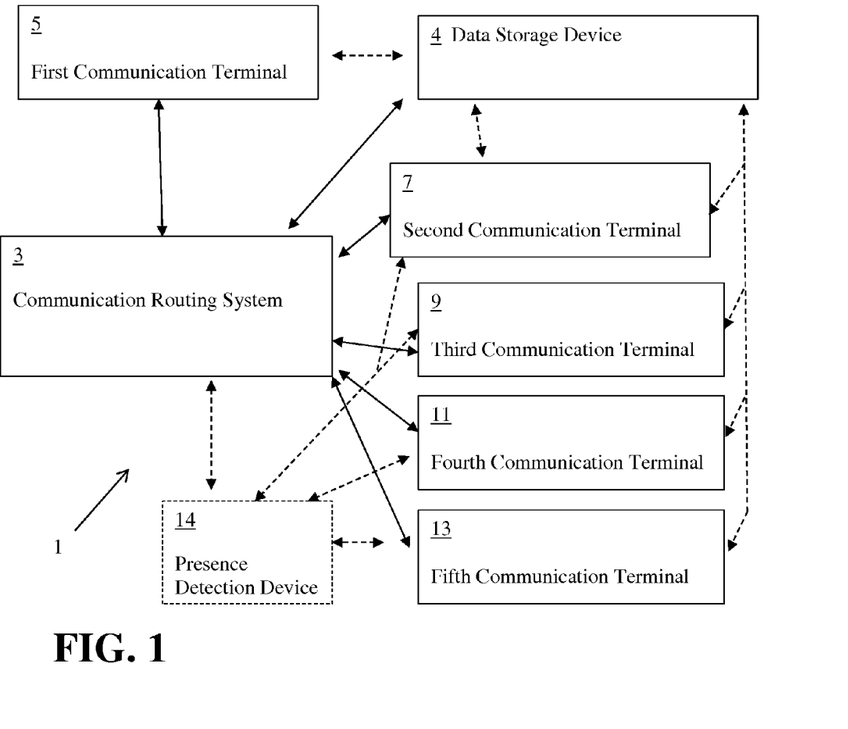
FIG. 1 is a block diagram of a first exemplary embodiment of a communication system.

A data storage device 4 can be communicatively connected to the communication routing system and be configured to store data about the communications engaged in by the users of the communication terminals. The data storage device 4 can also be communicatively connectable to each of the communication terminals for collecting and storing such data.

The communication terminals may be configured as telephones, laptop computers, electronic tablets, cellular phones, smart phones, or other types of electronic communication terminal devices that include hardware such as a processor, non-transitory memory, and at least one transceiver. For instance, each communication terminal can include hardware that includes a processor unit 28 that is communicatively connected to a transceiver unit 22, non-transitory memory 24, and at least one input device 26. The communication terminal can also include or be connected to at least one input/output device 25 such as a touch screen display or other type of input/output device as shown in broken line in FIG. 2. The processor unit 28 may be any type of hardware processor such as a microprocessor, a central processing unit, a core processor, interconnected processors, or other type of hardware processor device. The non-transitory memory can be a computer readable medium such as, for example, flash memory, a hard drive, or other type of non-transitory computer readable medium storage device. The transceiver unit 22 can include at least one receiver and at least one transmitter. Each input device 26 can be a button, a keypad, a keyboard, a mouse, a microphone, or another type of input device. The processor unit 28 can also be connected to an output device such as a display device.

Figure 2:
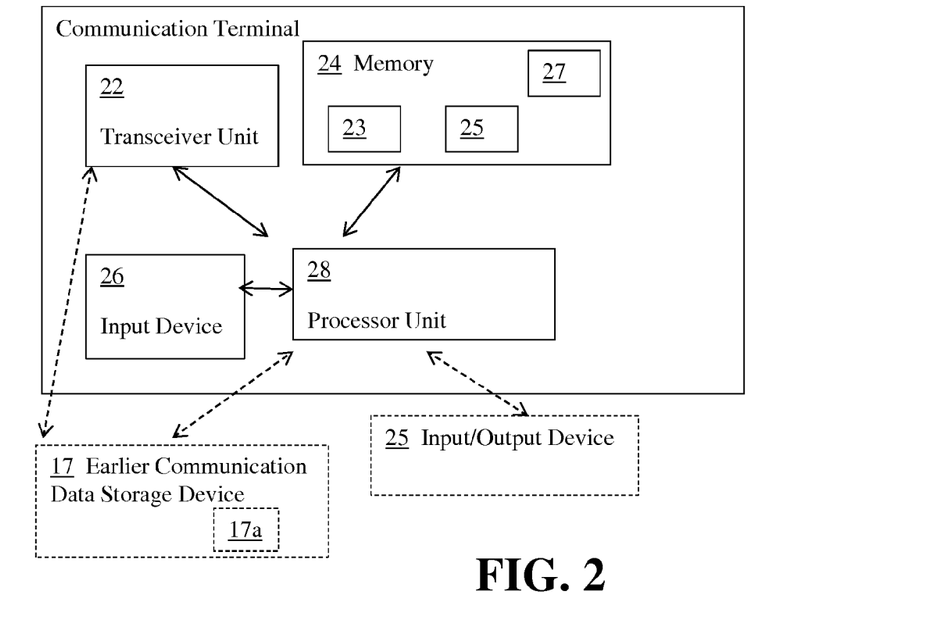
FIG. 2 is a block diagram of an exemplary embodiment of a communication terminal of the first exemplary embodiment of the communication system.

The memory 24 can have at least one application 23 stored thereon as well as other data such as communication history data 25 and at least one data store 27 (e.g. a database). The application 23 stored in the memory 24 can be defined by code that is executed by the processor unit 28 to cause the communication terminal to perform a method defined by the code of the application. In some embodiments, the code of the application 23 can require the processor unit 28 to access data stored in the data store 27 and/or the communication history data 25 when the processor unit 28 is executing the application 23.

In some embodiments, communication history data may be stored in at least one data store 17a of an earlier communication data storage device 17 that is connectable to the communication terminal. The earlier communication data storage device 17 could be the data storage device 4 in some embodiments. In other embodiments, the earlier communication data storage device may be a separate data storage device configured to store communication history data for that specific communication terminal or a group of assigned communication terminals that may include the communication terminal.

Figure 3:
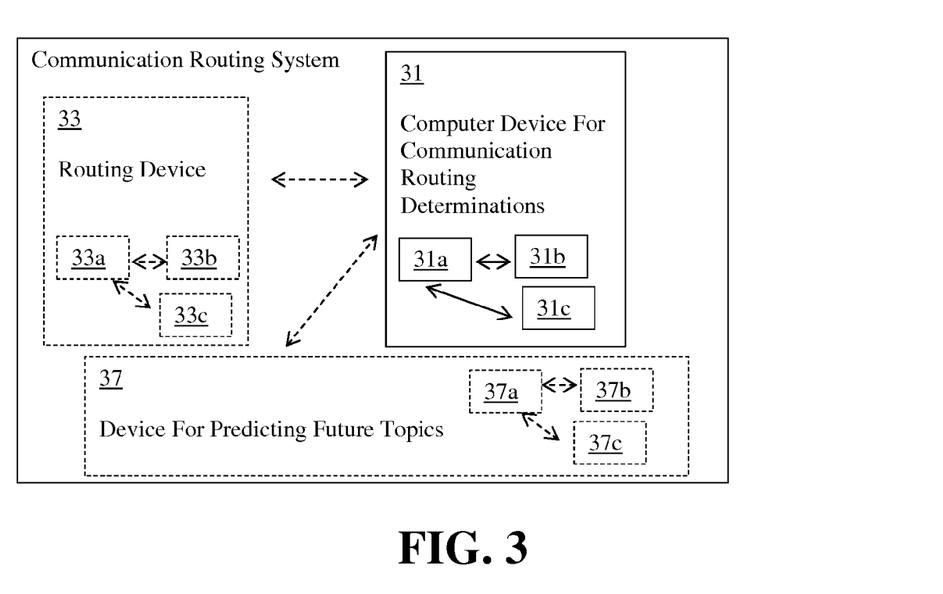
FIG. 3 is a block diagram of an exemplary embodiment of a communication routing system that can be utilized in the first exemplary embodiment of the communication system.

The communication routing system 3 can include a computer device 31 that is configured for communication routing determinations. The computer device 31 can be a routing device (e.g. a switch device or a communication server computer device) or may alternatively be communicatively connected to a routing device 33. The computer device 31 can include hardware, which can include a processor unit 31a that is communicatively connected to non-transitory memory 31b and at least one transceiver unit 31c. The memory can be configured to store at least one application and at least one data store. In some embodiments, the application can be defined by code that is executed by a processor when the application is run by the processor to cause the device to perform a method defined by the code. The data store of the memory can include communication history data obtained from past communications engaged in by the users of communication terminals. The processor unit 31a may be any type of hardware processor such as a microprocessor, a central processing unit, a core processor, interconnected processors, or other type of hardware processor device. The non-transitory memory 31b can be a computer readable medium such as, for example, flash memory, a hard drive, or other type of non-transitory computer readable medium storage device. The transceiver unit 31c can include at least one receiver and at least one transmitter.

A routing device 33 that may be communicatively connected to the computer device 31 that is configured for communicating routing determinations (for embodiments in which this computer device 31 is not a routing device) can also include hardware, which may include, for example, a processor unit 33a that is communicatively connected to non-transitory memory 33b and at least one transceiver unit 33c. The processor unit 33a may be any type of hardware processor such as a microprocessor, a central processing unit, a core processor, interconnected processors, or other type of hardware processor device. The non-transitory memory 33b can be a computer readable medium such as, for example, flash memory, a hard drive, or other type of non-transitory computer readable medium storage device. The transceiver unit 33c can include at least one receiver and at least one transmitter. Embodiments of the routing device 33 can be, for example, a switch device, a type of private branch exchange (PBX), a communication server computer device, a call server computer device, a text messaging server computer device, an email server computer device, or other type of communication routing device.

The computer device 31 can also be communicatively connected to a device 37 for predicting future topics. The device for predicting future topics 37 can be a computer device that includes hardware, which may include a processor unit 37a that is communicatively connected to non-transitory memory 37b and at least one transceiver unit 37c. At least one application and at least one data store may be stored in the memory 37b. In some embodiments, the application can be defined by code that is executed by a processor when the application is run by the processor to cause the device 37 to perform a method defined by the code for predicting, estimating, or otherwise determining one or more topics of a communication request sent by one user for establishing a communication session with at least one other user based on an evaluation of past communications data exchanged in by those users. The data store of the memory can include the communication history data obtained from past communications engaged in by the users of communication terminals (e.g. empirical communications history data of the users to be involved in a communication session sought to be established by a communication request as well as communication history data from other users). The processor unit 37a may be any type of hardware processor such as a microprocessor, a central processing unit, a core processor, interconnected processors, or other type of hardware processor device. The non-transitory memory 37b can be a computer readable medium such as, for example, flash memory, a hard drive, or other type of non-transitory computer readable medium storage device. The transceiver unit 37c can include at least one receiver and at least one transmitter. Embodiments of the device for predicting future topics 37 can be, for example, a work station, server computer device, desktop computer, or other type of computer device that is configured to store data about communications and be configured to identify one or more topics that may arise as a subject of a communication based on one or more topics of the communication request or the one or more topics of prior communications exchanged between a user requesting a communication and an addressee or callee of that communication request (e.g. an attempted phone call, text message, instant message, email, etc.).

Figure 4:
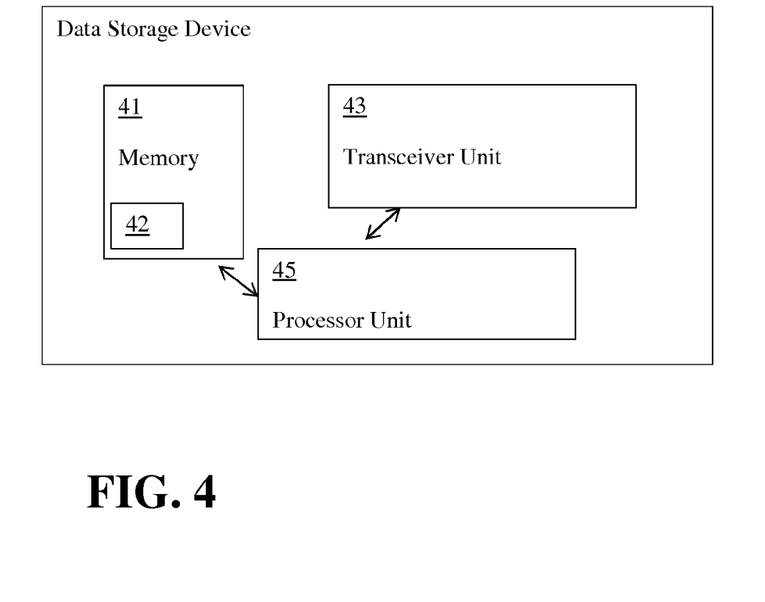
FIG. 4 is a block diagram of an exemplary embodiment of a data storage device of the first exemplary embodiment of the communication system.
Figure 5:
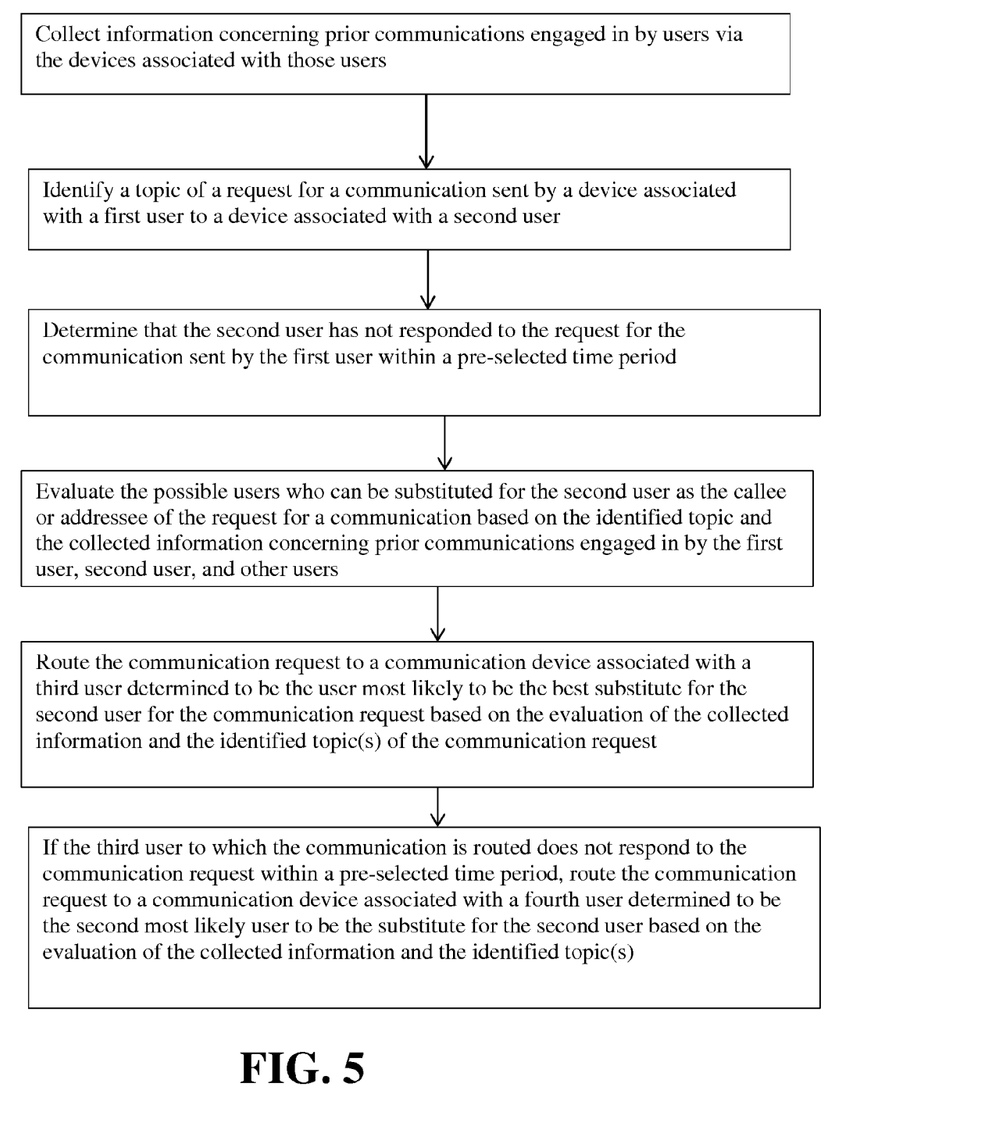
FIG. 5 is a flow chart illustrating an exemplary method for routing a communication request that may be utilized by an embodiment of the communication system and/or a device of the communication system.

The data storage device 4 can also be a computer device that includes hardware. The data storage device can include non-transitory memory 41 that has at least one data store 42 stored therein. The memory 41 can be communicatively connected to a processor unit 45. The processor unit 45 can also be communicatively connected to a transceiver unit 43. The processor unit 45 may be any type of hardware processor such as a microprocessor, a central processing unit, a core processor, interconnected processors, or other type of hardware processor device. The non-transitory memory 41 can be a computer readable medium such as, for example, flash memory, a hard drive, or other type of non-transitory computer readable medium storage device. The transceiver unit 43 can include at least one receiver and at least one transmitter. The one or more data stores 42 stored in the memory 41 can include a database relating to past communications exchanged between different users of different communication terminals and can also include a data store configured to facilitate the identification of topics of a communication request that are likely to be involved in a communication session established via a communication request. Embodiments of the data storage device can include, for example, a database server computer device, a workstation, a computer, or other type of data storage device that has hardware for storing data and communicating with other devices so that such stored data is accessible to those devices.

The communication system 1 can be configured to facilitate the routing of requests for communication sessions or communication connections, such as requests for phone calls or instant messaging sessions. For example, the communication routing system 3 of the communication system 1 can be configured to facilitate the connection of a first user attempting to initiate a communication session by sending a first communication request via first communication terminal 5 with the routing of that first communication request to a user of a communication terminal that is most likely to be able to address the topic or topics of the communication request. Such a routing of a communication request can be based on stored data that includes stored communications the first user may have engaged in in the past with other users via phone, email, text message, social network, instant messaging, Short Message Service (SMS) message, or other type of communication as well as the communications the other users may have engaged in in the past utilizing those same types of communications. In this way, when a communication request is directed to a system to be routed for answering by a particular person, the communication routing system 3 of the communication system 1 can determine which user should receive that communication request and then route the communication request to that user or communicate with a routing device to cause the communication request to be sent to that user (e.g. a communication terminal associated with that user or an address associated with the user such as the user's phone number, email address, instant messaging address, text messaging address, social messaging address, etc.).

As another option, or an alternative, when a communication request from a first user addressed to a second user or the second communication terminal 7 associated with that second user (e.g. a phone call) is not answered within a pre-selected time period, the communication routing system 3 can be configured to route the communication request to another user that is most likely to be able to address the one or more topics of that communication request by determining who that user is most likely to be based on past communications engaged in by the first user, second user, and other possible users who may be available to receive the communication request. After that determination is made, the communication request that was not answered by the second user within the pre-selected time period can be routed to a communication terminal associated with the user determined to be most likely able to address the one or more topics predicted to be the subject of the communication request (e.g. a telephone associated with that user such as, for example, that user's mobile phone or user's office desktop phone) by routing of that communication request via the communication routing system 3 and/or communicating with a routing device 33 to have that communication request routed to the identified user via an address associated with that user (e.g. an email address, phone number, social messaging address, text message address, instant messaging address, etc.) or to the communication terminal associated with that user.

In some embodiments, at least one application stored in memory of a device of the communication routing system 3 can configure that system to determine which user should receive the communication request if that request is not accepted or answered for establishment of the requested communication session within a pre-selected time period such that a processor of a device of that system can perform the method defined by the application. For instance, the application can be stored in memory of a computer device 31 configured for communication routing determinations of the communication routing system that so that the processor of the computer device can execute the application to perform the method defined by the application for routing of communication requests.

In some embodiments, the communication terminals, communication routing system 3 and/or a data storage device 4 may be configured to collect data on communications and/or store that data in at least one data store (e.g. at least one database). The data that is stored may include information identifying the communication participants' roles in the communication (e.g. addressee, sender, callee, caller, conference call participant, instant messaging participant, etc.), the type of communication (e.g. phone call, SMS message, instant message, email, social network message, etc.) the one or more topics of the communication, and a time of the communication. All topics, communication party roles, and a rating for each party can be stored in at least one data store for historical communications exchanged by users of a communication system. The collected data may then be utilized to determine how to route a communication request that is received at a future time.

Embodiments of the system can be configured for collection of data to occur in a number of different ways. For instance, the time of each communication can be obtained from time information associated with each communication session (e.g. text message, instant message, email, phone call, conference call, calendar entry, etc.). The topics of the communication can be determined by the communication routing system 3 (e.g. computer device 31 or device 37) or a communication terminal for each user in a number of different ways for saving in a data store with other data about that communication for storage and subsequent use of empirical communication data. For instance, topic information collected for a communication can be based on input provided by a user via a communication terminal that user is using that identifies one or more topics of a communication, can be extracted from the subject of the message (e.g. subject of an email or calendar entry), can be extracted from text of a message (e.g. text of a text message, email message, or instant message), via data manually entered by a communication party using a communication terminal while a communication session is ongoing or after it has ended, or via data manually entered by a communication party using a communication terminal before the communication session has started (e.g. in a configuration step or prior to a communication request being sent to establish the communication session).

The role each communication party (e.g. callee and caller, conference participant, addressee, sender, etc.) may have with a communication that has its relevant data stored for subsequent use in communication routing can be determined in a number of different ways as well. For instance, the role of each communication party can be determined from the department that user is assigned to in an organizational data base saved in memory of a data storage device 4 or the communication routing system 3. As another example, the historical communication profile of one or more users and/or related communication (e.g. calling times and topics) can be utilized to determine the role of a communication participant for storing data about the role of each communication participant in a data store for subsequent use in routing communications. As yet another example, the role of each party can be based on information that is manually entered by one or more users via use of at least one communication terminal. For instance, roles in different communications can be entered via input provided by one or more users via their communication terminal(s) that identifies the role of at least one communication party of a communication session during the session, before the session is initiated, and/or after the communication session has ended. Communication systems can be configured to utilize all such data collection options for identifying and saving data relating to communication partner roles for each communication that is stored in a data store for subsequent use in routing communications.

In some embodiments, the communication routing system 3 can be configured to automatically try to find an alternative party for receipt of a request to establish a communication sent by a first user (e.g. a callee or sender) that is directed to a first listed recipient who is unavailable or otherwise fails to respond to that request within a pre-selected time period via user of that user's communication terminal. In some embodiments, the communication routing system can be configured to identify an alternative addressee/callee/recipient of such a communication request by first determining from topic overlaps of the first user and the first listed recipient (e.g. a second user) to determine a probable intention of the first user's attempt for establishing a communication session (e.g. determining a probable intention by identifying one or more topics of the communication session sought to be established via the communication request). Afterwards, searching can be conducted to identify alternative parties (e.g. third, fourth, fifth, and other users) who could result in a similar topics overlap with the first user and the communication request's intended recipient. An alternative user to receive the communication request sent by the first user (e.g. callee or sender) can then be determined from the similar topic overlaps of the different alternative users and a determined probability that that alternative party could best address the one or more topics. For instance, the possible similar topics and likelihood of each of the alternative parties being able to address those topics can be factored into selecting the best intention overlap. The communication request sent by the first user to the initially intended recipient can then be routed to that alternative party if that communication request is not answered for establishing a communication session within a pre-selected time period.

Figure 6:
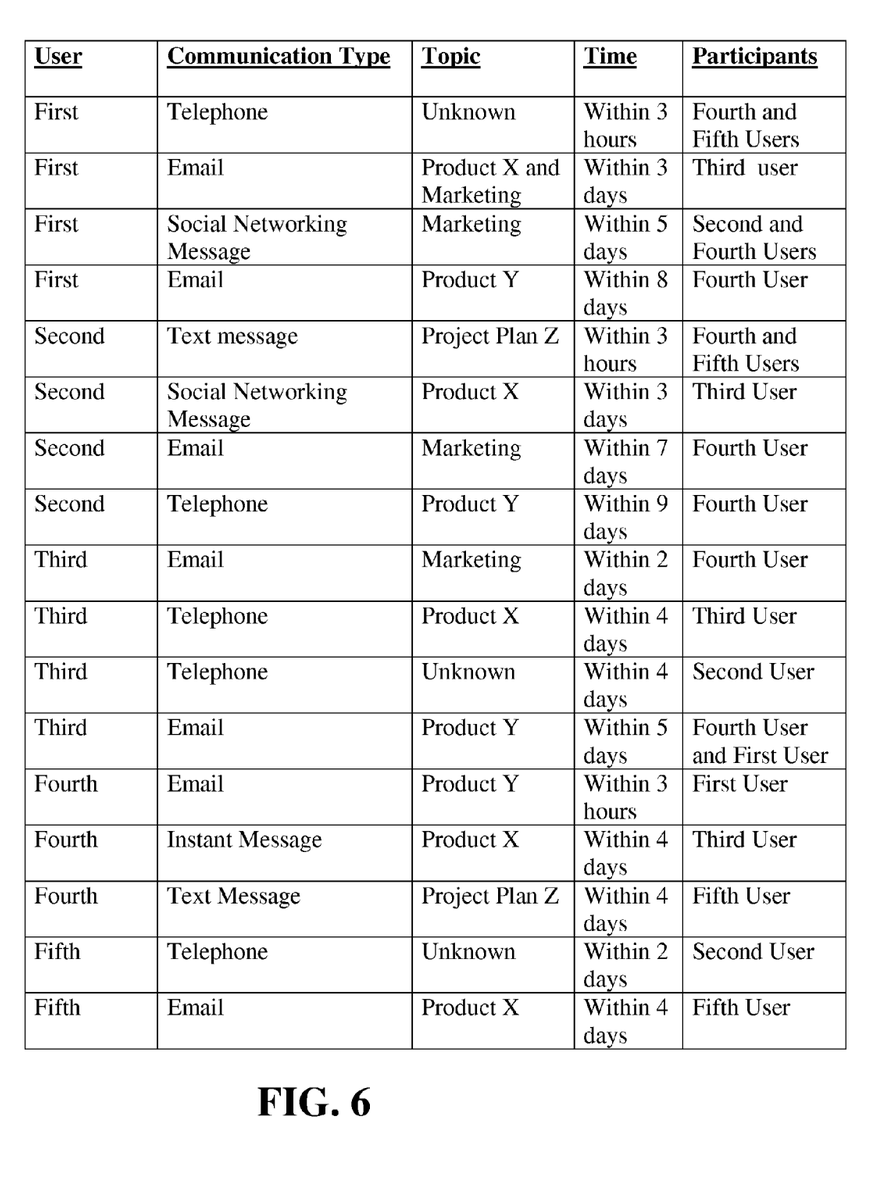
FIG. 6 is a table illustrating an exemplary data store element that may be stored in the data storage device or an element of the communication routing system of the first exemplary embodiment of the communication system.

The table of FIG. 6 identifies exemplary information that can be collected and stored from monitoring of communications engaged in by users of a communication system. For instance, the information of the table of FIG. 6 could be information that the communication routing system 3 may have collected and subsequently communicated to the data storage device 4 for storage of that data in the memory of the data storage device 4. Alternatively, the table of FIG. 6 identifies information that can be stored in the memory of the communication routing system 3. As yet another option, the table of FIG. 6 can illustrate information that is stored in the data storage device 4 or the communication routing system 3 that was obtained via communications the data storage device 4 or communication routing system 3 had with the communication terminals of the different users and/or earlier communication data storage devices 17 associated with one or more of those users to collect data from the communication terminals related to communications engaged in by users of those communication terminals and store such data in at least one data store stored in its memory. For example, each communication terminal can be configured to store data relating to user communications and periodically send that stored communication data to the data storage device 4 for storage and use of that data. As another example, each communication terminal can be configured to store such empirical communication data and periodically send that data to the computer device 31 or device 37 of the communication routing system 3. As yet another example, each communication terminal can be configured to store such communication data in an earlier communication data storage device 17 and the data storage device 4, computer device 31 that is configured for communication routing determinations, and/or device 37 for predicting future topics can be configured to obtain such data from the one or more earlier communication data storage devices 17 via periodic communications exchanged with the earlier communication data storage device 17.

For example, the first user of the first communication terminal 5, the second user of the second communication terminal 7, a third user of the third communication terminal 9, the fourth user of the fourth communication terminal 11, and the fifth user of the fifth communication terminal 13 may each engage in use of their communication terminals for sending and receiving various communications such as telephone calls, email messages, text messages, instant messages, and social network messages (e.g. messages from one or more social networking applications and/or websites via a social networking server computer device connection to their communication terminal such as, for example, one or more direct messages sent and/or received utilizing a Twitter application offered by Twitter Inc.). Each communication terminal may store data about each such communication and subsequently send that data to the storage device 4 for collection in a data store. As another option, the communication routing system 3 can include one or more routing devices 33 that collect such data and send it to the data storage device 4 for storage in a data store or save such data in the memory of a device of the communication routing system 3 (e.g. computer device 31 and/or device 37). That stored data can be configured as a table or other database element that can include information such as the information shown in FIG. 6.

Thereafter, a first user may utilize the first communication terminal 5 to attempt to place a phone call or send some other type of communication request directed to the second user of the second communication terminal 7 for establishing a communication session with that second user via the first and second communication terminals 5 and 7 (e.g. a phone call, etc.). If the second user does not answer the phone call or other type of communication request within a pre-selected period of time (e.g. 1 second, 2 seconds, 3 seconds, 5 seconds, or other time period), the communication routing system 3 may route the communication request to another communication terminal of another user that it determines to be most likely to be able to address at least one topic that is determined to be involved in the communication session sought to be established via the communication request sent by the first communication terminal 5 of the first user. The communication routing system 3 may make such a determination via at least one of a computer device 31 that is configured to make communication routing determinations and device 37 for predicting future topics based on the collection of data about past communications the users of the communication system have engaged in prior to that communication request being sent. After the computer device 31 and/or device 37 assesses such information, the device 31 may be configured to directly route the communication request to the third communication terminal 9 of the third user or communicate to the routing device 33 of the communication routing system 3 that the third communication terminal 9 of the third user is the destination to which the communication request should be routed if the communication request is not responded to within the pre-selected time period at the second communication terminal 7. The communication request can then be routed to the third communication terminal 9 prior to the communication request being delivered to a voice mail system, never being answered before the communication request is terminated as unanswered, or being unexpectedly and belatedly answered by the second communication terminal.

The quick routing of a communication request to an available user when the addressed user is unavailable for the communication session that was initially sought to be established can allow communications to be exchanged to improve the efficiency by which the first user may obtain information about one or more topics for performing a task. The quick routing of the communication request to an available user can also improve the service provided to the first user. In the event the first user is a customer, that user's view of customer service being provided to that user can be viewed more favorably as compared to having that user's communication request being placed on hold for some indefinite time period or providing a voice mail and subsequently waiting for a return call.

The determination of which user is most likely to be able to address at least one of the estimated topics of the communication request can be made by the computer device 31 that is configured for communication routing determinations or the device 37 for predicting future topics in a number of ways. For instance, the communication behavior of the sender of the communication request (e.g. the first user of the first communication terminal 5, the caller, the sender of an instant message, etc.) can be assessed along with communication behavior of the party to be contacted (e.g. the second user of the second communication terminal 7, the called party, the addressee, etc.) at the time the communication request is sent from the first communication terminal 5 to the second communication terminal 7. The communication behavior can be utilized to identify and estimate the topic or topics of the communication request that can subsequently be used to identify which user is most likely to be best suited for addressing at least one of such topics in the event the second user does not answer the communication request at the second communication terminal 7 within the pre-selected time period.

The computer device 31 for communication of routing determinations or the device 37 for predicting future topics can be configured to weigh different topics of prior communications engaged in by the first user to identify possible topics for the communication request. The weighing of the topics can be based on the other personnel involved in the applicable communications as well as the identified topics of the communications and how recently those communications took place. For instance, based on the collection of data of FIG. 6, the topics to be weighted for the first user can be determined to be: Marketing as 85%, Product X as 65% and Product Y as 50% as the topics in the communications. For this example, Marketing may be weighed more heavily because it was listed within the topics of two of the four communications. Product X may be weighed more heavily (e.g. higher) than Product Y as Product X was a topic of a communication more recently than the communication that lists Product Y as a topic.

The topics of communications in which the second user was involved may also be weighed to help predict, or estimate, the topic of the communication request sent by the first communication terminal 5. Based on the exemplary data of FIG. 6, such weighing of topics can be based on the topics of those past communications as well as the communication participants and time past since those communications took place. For instance, the weighing of topics for the second user in connection with predicting the topic of the communication request sent by the first communication terminal 5 can be: Project Plan Z 90%, Product X 70%, Marketing 55%, and Product Y 45%.

The probabilities for identifying the topics of the communication request sent by the first user of the first communication terminal 5 to the second user of the second communication terminal 7 may then be determined by the computer device 31 that is configured to make communication routing determinations or the device 37 for predicting future topics. Those topics may be weighed by summing the determined topics for the topics that are common to the communications of the first and second users (e.g. topics form communications involving the first user that match topics of communications involving the second user). For the example of FIG. 6, the determined topics that are common to the first and second users' communications may be determined as follows: Marketing=140% (85%+55%), Product X=135% (65%+70%), Product Y=95% (50%+45%).

Based on the determination of possible topics, the topic of marketing and at least one of Product X and Product Y may be determined to be the most likely topics of the communication request. Further, the topic of Product Y or Product X alone is less likely to be present than the topic of Marketing. In some embodiments, a computer device 37 that is configured to predict future topics may make such a determination and subsequently send the identified predicted topics to the computer device 31 configured for communication routing determinations for its subsequent use in determining the user that may best address the one or more topics of the communication request sent by the first user of the first communication terminal 5 in the event the second user does not timely respond to that communication request via the second communication terminal 7.

After identification of the predicted topics is made, a most suitable replacement for the second user to address the one or more topics of the first user's communication request sent via the first communication terminal 5 may be made by the computer device 31 that is configured for communication routing decisions. Such an identification can be based on an assessment of the other communications involving other communication participants and other users within the data of the data storage device 4 or communication routing system 3 (e.g. the memory of the routing device 33, computer device 31, or device 37) to identify the user that has the most relevance to the first user for at least one topic that is estimated as being the subject of the communication request sent by the first user via the first communication terminal 5.

For instance, the communication behaviors of the other users, such as the third user of the third communication terminal 9, fourth user of the fourth communication terminal 11, and fifth user of the fifth communication terminal 13 can be assessed to determine which of these users may be the most suitable substitute for the second user in the event the second user is unable to timely respond to the communication request. For example, the communication behaviors of each user may be weighed based on communication topics, communication partners, and time to weigh the topics to which those users are most likely familiar with. For example, based on the information of the example of FIG. 6, the weighing of topics for the third user may be Marketing=85%, Product X=80%, and Product Y=70%, the weighing of topics for the fourth user may be: Product Y=90%, Product X=80%, and Project Plan Z=80%, and the weighing of topics for the fifth user may be: Product X=60%.

The probable intention for contacting the third, fourth and fifth users by the first user of the first communication terminal 5 that sent the communication request may then be determined by summing the probabilities for the one or more topics of the communication request directed to the second communication terminal 7 of the second user with the shared topics of communications engaged in by the other possible users (e.g. topics for communications common to the first user and each of the other users). For example, the probable intention calculation for the third user may be determined to be 170% for Marketing (e.g. sum of marketing weights for the third and first user), 145% for Product X (e.g. sum of the Product X weights for the first and third users), and 120% for Product Y (e.g. sum of weights for the first and third users). The probable intention calculation for the fourth user may be: 140% for Product Y (e.g. a sum of 90% for Product Y of the fourth user and 65% for Product Y of the first user) and 145% for Product X (e.g. the sum of the weights for Product X between the first and fourth user). The probable intention calculation for the fifth user may be determined to be 125% (e.g. a sum of 60% of Product X for the fifth user and 65% probability of Product X found for the first user). Based on these calculations, the computer device 31 configured for communication routing determinations can determine that the third user of the third communication terminal 9 is best for addressing at least one identified topic of the communication session sought to be established via the first user's communication request and can determine that the fourth user is the second best for addressing at least one identified topic of the communication session sought to be established via the first user's communication request as the third and fourth users have the highest and second highest probabilities for responding to at least one predicted topic of the communication session that the first user seeks to establish with the second user.

The computer device 31 configured for communication routing determinations can cause the communication request sent by the first terminal to be routed to the third communication terminal 9 if the second communication terminal does not accept the communication request to establish a communication session (e.g. phone call) within a preselected time period. Thereafter, the computer device 31 configured for communication routing determinations can cause the communication request sent by the first terminal to be routed to the fourth communication terminal 11 of the fourth user in the event the third communication terminal 9 does not respond to the communication request for establishing a communication session with the first communication terminal 5 within a pre-selected time period (e.g. 1 second, three seconds, or five seconds, etc.) of that forwarded communication request being delivered to the fifth communication terminal 13. In some embodiments, the routing of the communication request to the third and/or fourth communication terminals can be accomplished by the computer device 31 being a routing device that routes such calls. In other embodiments, the routing of the communication request to the third and/or fourth communication terminals can be effected by the computer device 31 communicating with a separate routing device 33 to cause the communication request from the first communication terminal 5 to be forwarded or otherwise so routed.

In some embodiments, the weighing of probabilities and selection of a most likely user for responding to the first user's communication request can also be based on a detected presence of the available users so that the communication request is sent to a communication terminal of a user that is known to be available for a call. A presence server or other type of presence detection device 14 that is communicatively connected to the communication terminals of the users to monitor the presence of those users (e.g. out to lunch, on vacation, busy, on a phone call, in a meeting, on a business trip, etc.) may communicate with the computer device for communication routing determinations to identify the users currently available to respond to the first user's communication request. The availability of those users may then be the basis of filtering of the results by the computer device 31 so that the computer device 31 selects the user determined to be most likely to respond to the one or more topics of the communication request that is available. That presence detection device 14 presence data can be used such that total results deduced by the computer device 31 are filtered after total calculations are made for selection of a user to which a communication request is to be routed. Alternatively, the presence data can be used by the computer device 31 to filter the past communication data to be evaluated to exclude users so that the computer device 31 does not even attempt to calculate the likelihood that unavailable users may or may not be best positioned for responding to the communication request to conserve processing resources of the computer device 31 for only users that are currently available for responding to the communication request.

The factors that are considered for assigning a probability weight to different topics can include factors in addition to time, communication type, communication partners, and determined topics of past communications. For example, user availability, the position of the user within a company and the responsibilities allocated to that position can also be factors that are assessed when a weight for a particular topic is determined. As another example, calendar entries saved in a calendar of the communication terminal of the user or a communication server (e.g. an email server or calendar server) to which the first user may communication via the first communication terminal 5 identifying upcoming meetings or other events can be used to identify topics of the communication request. Additionally, the particular factors to be weighed for predicting topics of a communication can be any of a number of different factors and each of those factors may have a different weight for determining an overall probability that a particular topic is to be a topic of a particular communication request. Further, the computer device 31 can be configured such that the weights that are applied based on those different factors change over time based on empirical data of the routing of communications to improve the accuracy of the routing determinations made by the computer device 31 by changing the weighing of different factors for assessing a topic of a communication or weighing which particular topic may be most likely the subject of a communication request. Further, the evaluation may be based on communications that took place within a particular predefined time period from the time a communication request to be rerouted is assessed to ensure stale data that may no longer have much accuracy value in predicting topics of that communication request are not considered (e.g. only communications within 14 days, 30 days or 60 days of the received communication request are considered, etc.).

The identification of topics for different communication requests can be assessed by the device of the communication routing system 3 (e.g. computer device 31 or device for predicting future topics 37) or that data storage device 4 that collects the communication data. The topics can be identified via text searching of the subject and/or body of communication messages such as emails, text messages, or instant messages. The topics of phone calls can be determined by a user using his or her communication terminal to send data to the device saving such data to identify the topic of that communication or by entering such data into his or her communication terminal that subsequently saves that user input data and sends it to the device storing the data (e.g. data storage device 4, computer device 31 or device for predicting future topics 37). In yet other embodiments, it is contemplated that the voice data may be recorded and the recorded voice data of the phone call can be evaluated to determine the one or more topics of those calls.

The routing of communications so that a communication is routed from a called or attempted to be contacted user to another user after a pre-selected time period can be configured to occur so that such rerouting of the communication request occurs prior to that communication request being answered by the intended called party or intended addressee. In some instances, the communication request may be forwarded from the second communication terminal to another communication terminal by a routing device to reroute the communication request. In other instances, such as a text message or instant message session, the communication request may be delivered to the new user instead of the initially addressed user. For example, the initial message may either be removed such that a second user that was the initially intended recipient of a message addressed by the first user and sent by the first user via the first communication terminal 5 never sees the message via the messaging interface of the second communication terminal 7 or may be saved for viewing by the second user but have indicia or other information that is communicable to the second user via the second communication terminal 7 to indicate that the message was sent to another user or addressed by another user.

Embodiments of the communication system can be configured in different ways to meet different sets of design criteria. For instance, in some embodiments, the communication routing system 3 can be configured to only include a switch device or other routing device 33 that is configured such that it includes the functionality of the computer device 31 that is configured for communication routing determinations and the device 37 for predicting future topics. In other embodiments, the routing device 33 can be communicatively connected to the computer device 31 that is configured for communication routing determinations and the computer device 31 can be configured to also include the functionality of the device 37 for predicting future topics so that this third device is included within the computer device 31. Additional devices for storage of past communications data and searching such data for topic relevant information can also be included in the communication routing system to provide additional memory and processing resources for the system (e.g. earlier communication data storage devices 17a and other devices can be included in the system, etc.). Additionally, embodiments of the communication system 1 can be configured so that the different communication terminals are in different enterprise local area subnetworks and that the communication routing system 3 is in a separate enterprise local area subnetwork that is connectable to these other subnetworks. In yet another embodiment, the communication routing system 3 can be configured to be in the same sub-network of an enterprise network as all the communication terminals to which it may communicate. In yet another embodiment, the communication routing system 3 can be in a remote network that is communicatively connectable to the communication terminals via an inter-network connection (e.g. the internet) and at least some of the communication terminals may be located in different local area networks (e.g. different local area networks and/or wireless local area networks etc.). As yet another example, the communication system 1 can also include other network nodes, such as, for example, authentication servers, access points, gateways, routers, border control devices, and/or other types of network elements as well as email server computer devices, text messaging service hosting computer devices, instant messaging hosting server computer devices, call control server computer devices, conference call server computer devices, and calendar service hosting computer devices that are communicatively connectable to the communication routing system 3.

While certain exemplary embodiments of the communication system and methods of making and using the same have been shown and described above, it is to be distinctly understood that the invention is not limited thereto but may be otherwise variously embodied and practiced within the scope of the following claims.

What is claimed is:

1. A method for routing a communication request for a communication session comprising:

receiving a first request for a communication session from a first communication terminal of a first user that is addressed to a second communication terminal of a second user or an address associated with the second user;

evaluating past communication data for communications involving the first user and the second user to identify topics that are common to communications involving the first user and communications involving the second user to identify probable topics of the first request;

evaluating past communication data for communications involving other users to determine topics that those users are able to address for the first user;

determining that a third user of the other users is best for addressing at least one identified topic of the first request based on the evaluating of the past communication data for communications involving the other users and an evaluation of past communication data involving the first user; and upon a determination that the first request was not accepted for establishing the communication session within a pre-selected time period, routing the first request to a third communication terminal of the third user determined to be the best for addressing the at least one identified topic of the first request or an address associated with the third user.

2. The method of claim 1 further comprising:
determining that a fourth user of the other users is second best for addressing the identified most probable topic of the first request based on the evaluating of the past communication data for communications involving the other users and an evaluation of past communication data involving the first user; and
upon a determination that the first request was not accepted for establishing the communication session with the third user after the first request was routed to the third communication terminal of the third user or the address associated with the third user within a pre-selected time period, routing the first request to a fourth communication terminal of the fourth user or an address associated with the fourth user.

3. The method of 1, comprising:
collecting communication data for communications involving the users to identify topics of communications exchanged between different users; and
saving topic information identified from the collection communication data in non-transitory memory.

4. The method of claim 1, wherein the evaluating past communication data for communications involving other users to determine topics that those users are most likely able to address for the first user comprises:
evaluating topics from past communications involving the first user and the second user to identify a probability that the identified topics common to the first and second user will be the subject of the communication session sought to be established via the first request.

5. The method of claim 4, wherein the determining that the third user of the other users is best for addressing the identified most probable topic of the first request based on the evaluating of the past communication data for communications involving the other users and an evaluation of past communication data involving the first user comprises:
using the identified topics that are common to the first and second user to identify the third user.

6. The method of claim 5, wherein the using of the identified topics that are common to the first and second user to identify the third user comprises:
evaluating topics from past communications involving the other users to identify at least one topic from those past communications that are common to the determined topics of the communications involving the first user; and
comparing the communications of the other users having topics that are common to the determined topics of the communications involving the first user to determine a user that has a highest relevance to at least one of the determined topics of the communications involving the first user.

7. The method of claim 6 wherein the highest relevance of a user is determined to be a user having a largest weight of probability that that user is experienced with at least one identified topic of the communication session that is intended to be established via the first request.

8. The method of claim 5, further comprising:
filtering the evaluating of topics from past communications involving the other users to identify at least one topic from those past communications that are common to the determined topics of the communications involving the first user based on presence information of the other users.

9. The method of claim 5, further comprising:
defining data of the past communications involving the other users based on presence data for those users so that non-available users are filtered out of the data prior to performing of the evaluating of topics from the past communications involving the other users so that a non-available user is not identifiable as the third user.

10. The method of claim 5, wherein the first request is an attempted call initiated by the first communication terminal to establish a phone call with the second communication terminal.

11. The method of claim 10, wherein a routing device receives the first request prior to attempting to establish a phone call connection between the first communication terminal and the second communication terminal.

12. The method of claim 5, wherein a communication routing system that is communicatively connectable to the first and second communication terminals performs the method.

13. A communication routing system comprising:
at least one device having hardware, the hardware comprising at least one processor connected to non-transitory memory and at least one transceiver unit;
the memory having at least one application stored therein that defines a method that is performed by the communication routing system when the application is executed by the processor, the method comprising:
evaluating past communication data for communications involving a first user associated with a first communication terminal and a second user associated with a second communication terminal to identify topics that are common to communications involving the first user and communications involving the second user to identify at least one probable topic of a first request that is sent by the first user via the first communication terminal to establish a communication session with the second user via the second communication terminal;
evaluating past communication data for communications involving other users associated with other communication terminals to determine topics that those users are most likely able to address for the first user;
determining that a third user of the other users is best for addressing at least one identified probable topic of the first request based on the evaluating of the past communication data for communications involving the other users and an evaluation of past communication data involving the first user; and
upon a determination that the first request was not accepted for establishing the communication session within a pre-selected time period, causing the first request to be routed to a third communication terminal of the third user determined to be the best for addressing the at least one identified probable topic of the first request or an address associated with the third user.

14. The communication routing system of claim 13, wherein the at least one device comprises a routing device communicatively connected to a computer device having the application stored in memory of the computer device.

15. The communication routing system of claim 13, wherein the method also comprises:
determining that a fourth user of the other users is second best for addressing the identified at least one probable topic of the first request based on the evaluating of the past communication data for communications involving the other users and an evaluation of past communication data involving the first user; and
upon a determination that the first request was not accepted for establishing the communication session with the third user after the first request was routed to the third communication terminal of the third user or the address associated with the third user within a pre-selected time period, causing the first request to be routed to a fourth communication terminal of the fourth user or an address associated with the fourth user.

16. The communication routing system of claim 13, wherein the method also comprises:
   collecting communication data for communications involving the users to identify topics of communications exchanged between different users; and
   saving topic information identified from the collection communication data in non-transitory memory.

17. The communication routing system of claim 13, wherein the evaluating past communication data for communications involving other users to determine topics that those users are most likely able to address for the first user comprises:
   evaluating topics from past communications involving the first user and the second user to identify a probability that the identified topics common to the first and second user will be the subject of the communication session sought to be established via the first request.

18. The communication routing system of claim 17, wherein the determining that the third user of the other users is best for addressing the identified most probable topic of the first request based on the evaluating of the past communication data for communications involving the other users and an evaluation of past communication data involving the first user comprises:
   using the identified topics that are common to the first and second user to identify the third user.

19. The communication routing system of claim 18, wherein the using of the identified topics that are common to the first and second user to identify the third user comprises:
   evaluating topics from past communications involving the other users to identify at least one topic from those past communications that are common to the determined topics of the communications involving the first user;
   comparing the communications of the other users having topics that are common to the determined topics of the communications involving the first user to determine a user that has a highest relevance to at least one of the determined topics of the communications involving the first user; and
   wherein the method further comprises one of:
      filtering the evaluating of topics from past communications involving the other users to identify at least one topic from those past communications that are common to the determined topics of the communications involving the first user based on presence information of the other users received from a presence detecting device; and
      defining data of the past communications involving the other users based on presence data for those users so that non-available users are filtered out of the data prior to performing of the evaluating of topics from the past communications involving the other users so that a non-available user is not identifiable as the third user.

20. A communication system comprising:
   a communication routing system having a computer device configured to make communication routing determinations, the computer device being configured to evaluate past communication data for communications involving a first user associated with a first communication terminal and a second user associated with a second communication terminal to identify topics that are common to communications involving the first user and communications involving the second user to identify at least one probable topic of a first communication request;
   the computer device configured to evaluate past communication data for communications involving other users associated with other communication terminals to determine topics that those users are most likely able to address for the first user;
   the computer device configured to determine that a third user of the other users is best for addressing at least one identified probable topic of the first request based on the evaluating of the past communication data for communications involving the other users and an evaluation of past communication data involving the first user; and
   the computer device configured such that, upon a determination that the first request was not accepted for establishing the communication session within a pre-selected time period, the first request is caused to be routed to a third communication terminal of the third user who was determined to be best for addressing at least one identified probable topic or an address associated with the third user.

* * * * *